3,103,744
DRY SHAVER WITH HAIR COLLECTING MEANS
Victor Kobler, 42 Huttenstrasse, and Werner Kobler, 43 Huttenstrasse, both of Zurich, Switzerland
Filed Aug. 12, 1960, Ser. No. 49,244
Claims priority, application Switzerland Aug. 15, 1959
2 Claims. (Cl. 30—41)

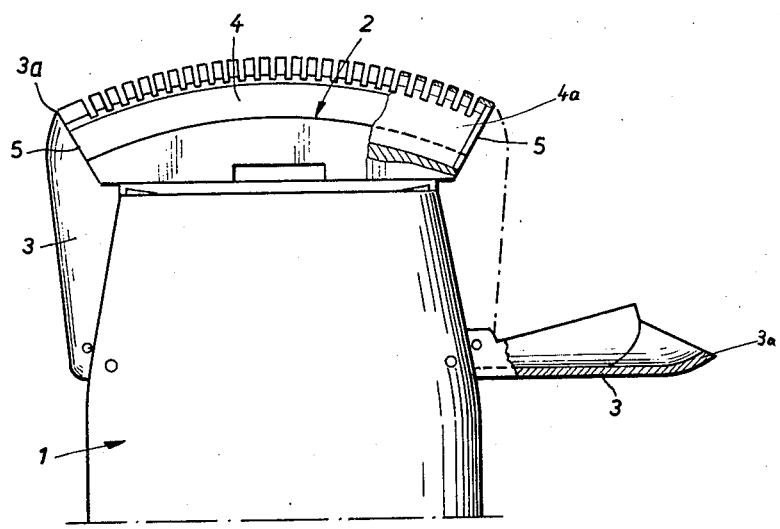

The present invention relates to dry shaving razors of the type having at least one elongated shear head which is provided with an external shear comb and an internal cutting blade. The shear head is arranged on a handle accommodating the driving motor of the device, and is closed at both ends by a hair-catching flap pivoted on the handgrip.

In the construction of such razors it is the usual practice to give the razor at the level of the hair-catching flaps approximately the same width as that of the main portion of the handle, so that the outer face of the hair-catching flaps is approximately in alignment with the associated lateral surfaces of the razor handle. Since it is not possible to impart to the hair-catching flaps any desired thin wall thickness and since in addition a certain hair-collecting space should be provided outside of the shear head and within said flaps, this condition unavoidably resulted in the fact that the shear heads of such razors have been made considerably shorter than the width of the device at the level of the hair-catching flaps. Moreover, since the open end walls of these shear heads in conventional razors extend parallel to each other, the provision of hair catching flaps resulted in a corresponding shortening of the shear head. In razors having an oblong, narrow handle, the one end of which carries one or more shear heads, this fact results in relatively short outer shear combs.

It is an object of the present invention to provide a dry-shaving razor of the type mentioned with a length of the external shearing comb approximately corresponding to the maximum width of the razor, without substantially enlarging the device in the zone of the hair-catching flaps, while maintaining a sufficiently ample hair-catching space. For this purpose the dry-shaving razor according to the invention comprises open end walls of the shear head which outwardly diverge from the bottom of the shear head at such an angle, that the length of the operating surface of the external shear comb is increased with respect to the bottom of the shear head.

The accompanying drawing shows by way of example a fragmentary view in elevation of razor according to the invention.

Referring to the drawing, the numeral 1 designates the casing of an electric driving motor which casing serves as handle. An elongated shear head 2 is mounted at one end of the casing 1 and has guided in its external shear comb 4 a toothed motor driven internal cutting blade 4a. The casing 1 is slightly tapered towards its end carrying the shear head, to provide space for hair-catching flaps 3 which are pivoted to the casing and can be turned downwards from their operating position in which they are applied against the end walls of the shear head. The outer surfaces of said flaps are approximately in alignment with the associated lateral faces of the non-tapered portion of the casing or handle 1. The elognated shear head 2 per se comprises a curved external shear comb 4 having transverse gaps provided between domed webs of rooflike cross-section.

The open end walls 5 of the outer shear comb 4 diverge at such an angle from the bottom of the shear comb, positioned upon the cover plate of the tapered casing 1 of the razor, that the external face of shear head is considerably longer than its bottom portion; in the example shown the external or outer length of the shear head is even somewhat greater than the maximum width of the casing 1. The shape of the hair-catching flaps 3 is conforming to the tapered portion of the casing 1 and the outwardly diverging end faces 5 of the shear head, whereby the outer edges 3a of the flap abutting against the outer edge of these faces of the shear head practically forms a sharp edge. The outer operating surface of the external shearing chamber 4 thus is not extended on both sides by outer end faces of the hair-catching flaps, which are ineffective with respect to the shaving operation, as this is the case in known devices of this type. The described construction is rendered possible because the end faces 5 of the shear head are inclined and taper towards the bottom of the shear head, so that sufficient space is available for the enlargement of the flaps 3, as required for sufficient mechanical resistance, immediately adjacent their outer edges 3a. On the other hand, owing to the inclined faces 5, a sufficiently large hair-catching space situated outside of the shear head is gained in proximity to the end faces of the latter, even when the external faces of the flaps 3 extend in approximate alignment with the lateral faces of the casing 1.

The principal advantages of the described inclined position of the end faces of the shear head, mounted upon a slightly tapered portion of the handle, thus are the relatively large operating surface of the external shear comb, the large proportion of the effective operating surface with respect to the total external surface of the shear head, which proportion is not decreased by any wide end faces of the hair-catching flaps, and the relatively large and favourably situated hair-catching space within the hair-catching flaps with the external surfaces of the hair-catching flaps situated in approximate alignment with the main parts of the lateral faces of the casing of the device. As shown in the drawing, the end faces of the internal cutting blade 4a are inclined in the same manner as the end faces 5 of the external shear comb 4. The internal blade thus feeds the cut hairs in downwardly inclined direction to the hair-catching space.

Though the inclined position of the end faces of the shear head has been described in connection with a shear head which is curved in longitudinal direction, naturally the same provision can also be made for straight shear heads. However, for curved shear heads the arranged provision offers the additional advantage that less material has to be deformed in deep-drawing the external shear comb in comparison with the material required for deep-drawing a shear comb having an operating surface of equal length, but end walls extending at right angles to the bottom surface.

Likewise, it is possible, when the shear heads are placed upon a non-tapered casing, to position the end faces of said shear heads at such an incline, that the operating surface of the shear head will be larger than the bottom surface thereof.

We claim:
1. A dry-shaving razor comprising an elongated shearhead comprising an outer elongated comb which is convex in its longitudinal direction, and an elongated motor driven cutter within said comb; a handle comprising a casing on one end of which said shearhead is mounted, said handle tapering inwardly adjacent said shearhead; said shearhead flaring outwardly adjacent said handle to increase the length of the cutting portion of the shearhead, and hair-catching flaps pivotally mounted on the sides of said handle at points spaced from the shearhead mounting end and overlapping the ends of said shearhead forming hair catching pockets of large capacity.

2. A dry shaver according to claim 1 and in which the shearhead has a portion by which it is mounted on the handle which is longer than the adjacent portion of the handle and, thus, extends beyond the sides of said handle forming ledges, said side flaps having portions which underlie said ledges.

References Cited in the file of this patent

UNITED STATES PATENTS

| | | |
|---|---|---|
| 2,066,214 | Meyer | Dec. 29, 1936 |
| 2,286,061 | Burns | June 9, 1942 |
| 2,287,686 | Jones | June 23, 1942 |
| 2,379,969 | Kobler et al. | July 10, 1945 |
| 2,611,175 | Kobler et al. | Sept. 23, 1952 |

FOREIGN PATENTS

| | | |
|---|---|---|
| 519,096 | Great Britain | Mar. 15, 1940 |
| 870,959 | Germany | Mar. 19, 1953 |